(12) United States Patent
Yanase et al.

(10) Patent No.: US 7,498,503 B2
(45) Date of Patent: Mar. 3, 2009

(54) ELECTRONIC MUSIC APPARATUS CAPABLE OF CONNECTING TO NETWORK

(75) Inventors: Tsutomu Yanase, Hamamatsu (JP); Takeo Shibukawa, Iwata (JP); Ikuro Oshima, Machida (JP)

(73) Assignee: Yamaha Corporation, Hamamatsu-Shi (JP)

( * ) Notice: Subject to any disclaimer, the term of this patent is extended or adjusted under 35 U.S.C. 154(b) by 180 days.

(21) Appl. No.: 11/215,891

(22) Filed: Aug. 30, 2005

(65) Prior Publication Data

US 2006/0042453 A1    Mar. 2, 2006

(30) Foreign Application Priority Data

Aug. 31, 2004    (JP)    ............... 2004-251829

(51) Int. Cl.
  *G10H 1/00*    (2006.01)
  *G04B 47/00*    (2006.01)
(52) U.S. Cl. .......................................... 84/600; 368/10
(58) Field of Classification Search ................... 84/600; 368/10
  See application file for complete search history.

(56) References Cited

U.S. PATENT DOCUMENTS

| 6,175,872 | B1 | 1/2001 | Neumann et al. |
| 6,421,768 | B1 | 7/2002 | Purpura |
| 2003/0075036 | A1 | 4/2003 | Isozaki et al. |
| 2004/0220999 | A1 | 11/2004 | Kojima et al. |
| 2005/0122841 | A1* | 6/2005 | Yanase ......................... 368/10 |
| 2006/0156011 | A1* | 7/2006 | Masui ......................... 713/178 |

FOREIGN PATENT DOCUMENTS

| JP | 2001-027682 | 1/2001 |
| JP | 2001-148712 | 5/2001 |
| JP | 2003-076346 | 3/2003 |
| JP | 2004-234628 | 8/2004 |

OTHER PUBLICATIONS

Sun Na et al., "Implementation of Clock Synchronization in Distributed Network", China Academic Journal Electronic Publishing House, (Computer Engineering vol. 29, No. 14, Aug. 2003)—includes English abstract.
Endres, Johannes, "Timely Service, NTP Service and Client Under Linux", CT Magazine, Sep. 9, 2002, Issue 19, pp. 210, 213.
Baynetworks: "NTP System Implementation Model", Baynetworks, Sep. 29, 1997.
Partial English Translation of Japanese Office Action, mailed May 27, 2008; JP-2004-251829.

* cited by examiner

Primary Examiner—Jeffrey Donels
(74) Attorney, Agent, or Firm—Morrison & Foerster LLP

(57) ABSTRACT

An electronic musical apparatus comprises an instructing device that instructs establishment of connection to a network via a communication interface, a first time information obtaining device that obtains time information from a first time information provider connected to the network, a second time information obtaining device that obtains time information from a second time information provider connected to the network when the first time information obtaining device cannot obtain the time information, and an executing device that executes a service via the network by using the time information obtained from either one of the first and the second time information providers.

6 Claims, 4 Drawing Sheets

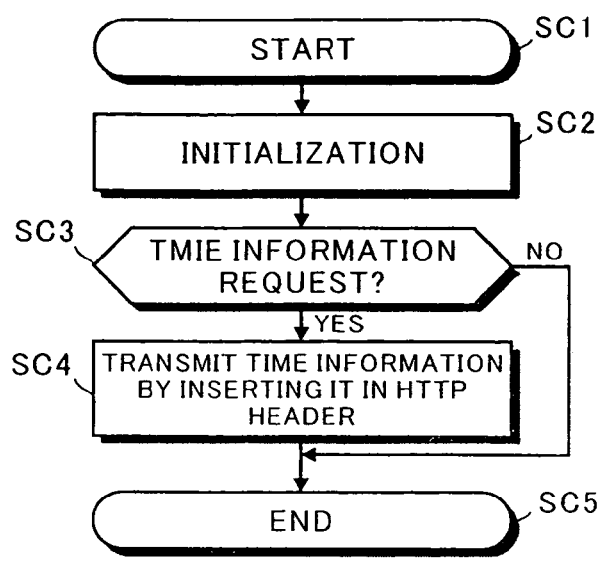

ELECTRONIC MUSIC APPARATUS CAPABLE OF CONNECTING TO NETWORK

CROSS REFERENCE TO RELATED APPLICATION

This application is based on Japanese Patent Application 2004-251829, filed on Aug. 31, 2004.

BACKGROUND OF THE INVENTION

A) Field of the Invention

This invention relates to an electronic musical apparatus, more in detail, relates to an electronic musical instrument that can connect to the networks.

B) Description of the Related Art

There is an electronic musical instrument that can connect to a musical contents providing server on a communication network such as the Internet and download and purchase musical contents (for example, refer to Japanese Laid-Open Patent 2003-076364).

Normally, when musical contents are purchased on the communication network, it is necessary to input personal information such as a user ID, a password and the likes. It is known that the Cookie by which the personal information can be stored in the user's apparatus for omitting the inputting the personal information from the next time and which can be used for user identification.

The Cookie is a format wherein a Web site provider temporally stores data in a visitor's (the user) apparatus via the Web browser, and in which information relating to the user, time and date of visiting the site for the last time, the number of visiting times can be stored.

In transmission of the user ID and the password when purchasing the musical contents, security is necessary. The SSL protocol that transmits and receives encrypted information on the Internet is known as what prevents data tapping, data falsification and pretending by combining security techniques such as a public key encryption and a secret key encryption, a digital certificate (SSL certificate) and a hash function.

The above-described Cookie and SSL certificate have validation date, and it is necessary to always keep a current time on the apparatus side to use the Cookie and the SSL certificate. Generally, since the electronic musical apparatus such as an electronic musical instrument cannot keep the current time inside the apparatus as different from a personal computer, it is difficult to receive an internet service requiring a current time.

Moreover, an network time protocol (NTP) sever is used as a server to be connected for obtaining time information on the Internet; however, some types of the Internet connection prohibits NTP usage, and the time information cannot be obtained by the NTP.

SUMMARY OF THE INVENTION

It is an object of the present invention to provide an electronic musical apparatus that can use the network service requiring a current time.

It is another object of the present invention to provide an electronic musical apparatus that can obtain time information from a network under a circumstance of prohibiting a usage of NTP.

According to one aspect of the present invention, there is provided an electronic musical apparatus, comprising: an instructing device that instructs establishment of connection to a network via a communication interface; a first time information obtaining device that obtains time information from a first time information provider connected to the network; a second time information obtaining device that obtains time information from a second time information provider connected to the network when the first time information obtaining device cannot obtain the time information; and an executing device that executes a service via the network by using the time information obtained from either one of the first and the second time information providers.

According to the present invention, an electronic musical apparatus that can use the network service requiring a current time can be provided.

Further, according to the present invention, an electronic musical apparatus that can obtain time information from a network under a circumstance of prohibiting a usage of NTP can be provided.

BRIEF DESCRIPTION OF THE DRAWINGS

FIG. 4 is a flow chart showing a time information transmitting process by an HTTP server according to the embodiment of the present invention.

FIG. 5 is a diagram showing a form of an enhancing part of an HTTP header according to the embodiment of the present invention.

DETAILED DESCRIPTION OF THE PREFERRED EMBODIMENTS

Figure 1:
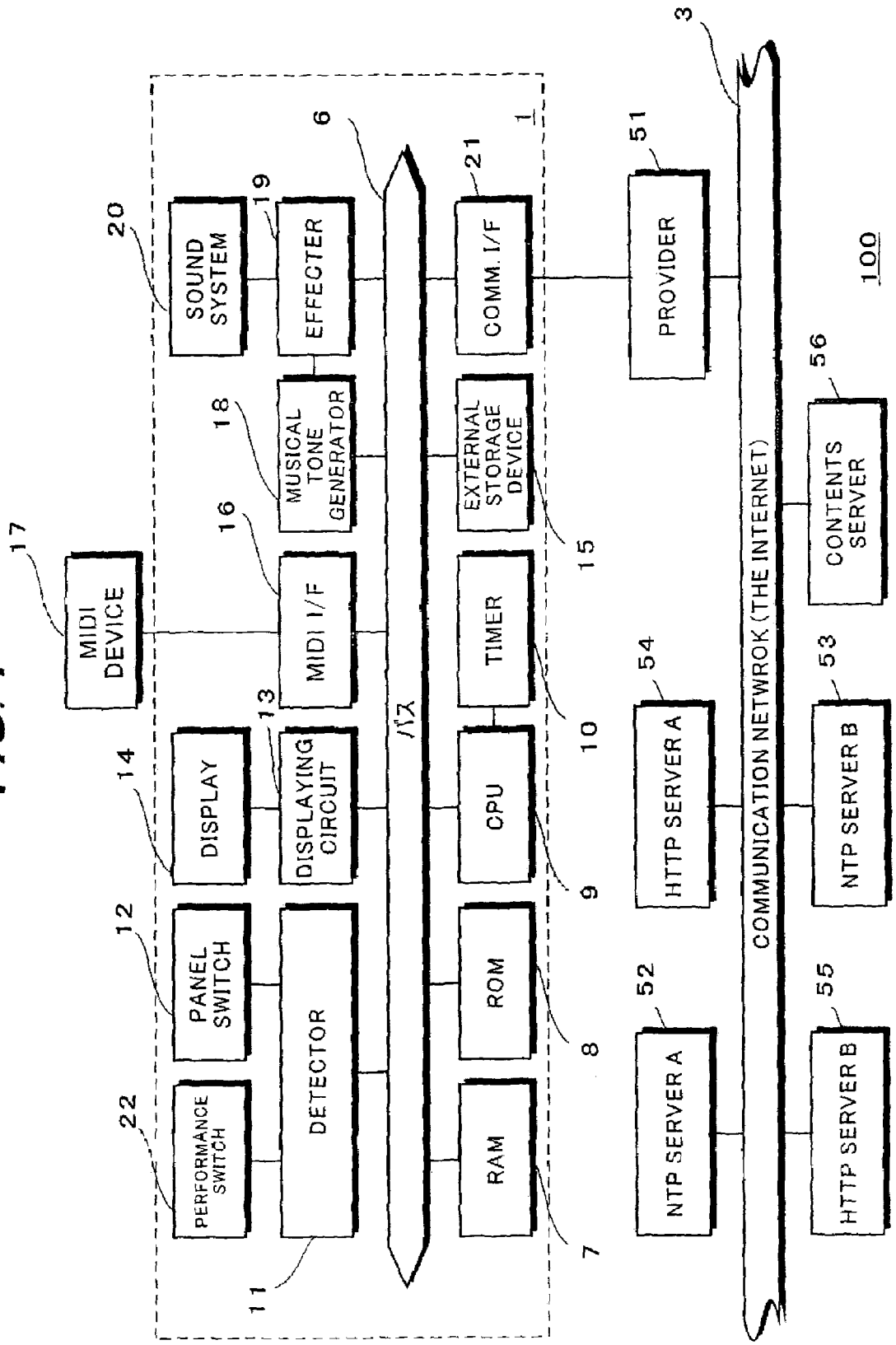
FIG. 1 is a block diagram showing a structure of a network system 100 according to an embodiment of the present invention.

FIG. 1 is a block diagram showing a structure of a network system 100 according to an embodiment of the present invention.

The network system 100 is consisted of an electronic musical apparatus 1 and a communication network (the Internet and the like) 3 connected with various servers such as a network time protocol (NTP) server A52, an NTP server B53, a hyper text transfer protocol (HTTP) server A54, an HTTP server B55, a contents server 55 and the like. The musical apparatus 1 can connect with the communication network 3 via a provider 51.

The NTP server A52 and the NTP server B53 are servers (time information providing means) for providing time data (NTP message) including time information (GMT standard time) by using the Network Time Protocol (NTP) that is a protocol for exactly adjusting an inner (built-in) clock of the electronic apparatus such as a computer by communicating with a client.

The HTTP server A54 and the HTTP server B55 are servers (time information providing means) for transmitting time information (GMT standard time) buried in a HTTP header based on time data request (GET request) from the electronic musical apparatus 1. Moreover, the hyper text transfer protocol (HTTP) server in this specification does not indicate a normal HTTP server, but indicates a server to transmit the time information (GMT) buried in the HTTP header.

The contents server 56 is a server for providing listening trials or downloading service of musical contents to a client such as the electronic musical apparatus 1 by using the Secure Sockets Layer protocol (hereinafter, called SSL) and the Cookie.

The electronic musical apparatus 1 is an electronic musical instrument or the like that cannot keep an inner clock when the power is turned off. Since the Cookie and the SSL certificate has validation date in order to use the service provided by the contents server 56, the real (current) time is needed to be kept in the electronic musical apparatus 1 when connecting with the contents server 56. In the embodiment of the present invention, the electronic musical apparatus 1 obtains time information by connecting with the NTP server A52 and keeps the real time in the electronic musical instrument 1 while the power is turned on. Moreover, when the electronic musical apparatus 1 cannot connect with the NTP server 52 for a certain reason on the server side, it will connect with the NTP server B53 to obtain time information.

For example, if the usage of the NTP protocol is prohibited by a part of CATV connection and firewall setting in the provider 51, the time information from the NTP server A52 and the NTP server B53 cannot be obtained. In that case, the electronic musical apparatus 1 obtains the time information by connecting with the HTTP server A54. If the electronic musical apparatus 1 cannot connect with the HTTP server A54 for a certain reason on the server side, it connects with the HTTP server B55 to obtain the time information.

As described in the above, by obtaining the time information by using the HTTP, exact time information can be obtained in the network connection that is prohibiting the usage of the NTP. Therefore, the network service that needs real time such as the SSL and the Cookie can be used.

An example of a hardware structure of the electronic musical apparatus 1 is explained in the below. The electronic musical apparatus 1 is, for example, an electronic musical instrument such as a musical keyboard, a musical tone generator, a mixer, a PA apparatus such as a recorder, and an audio-visual device such as a stereo component system. The electronic musical apparatus is an electronic apparatus for executing processes related to music.

The electronic musical apparatus 1 is consisted of a bus 6, a RAM 7, a ROM8, a CPU 9, a timer 10, a detector 11, a panel switch 12, a performance switch 22, a displaying circuit 13, a display 14 an external storage device 15, a MIDI interface 16, a musical tone generator 18, an effecter 19, a sound system 20 and a communication interface (I/F) 21.

The RAM 7, the ROM 8, the CPU 9, the external storage device 15, the detector 11, the displaying circuit 13, the MIDI interface 16, the musical tone generator 18, the effecter 19 and the communication interface (I/F) 21 are directly connected to the bus 6.

The RAM 7 has a working area of the CPU 9 and a buffer region and stores a flag, a register, various parameters and the like.

Various parameters and a control program or a program for realizing the embodiment of the present invention can be stored in the ROM 8. In this case, it is not necessary to store duplicated programs in the external storage device 15. Moreover, a rewritable flash memory other than normal read-only-memory is included as the ROM 8. Also, the URL of the plurality of the NTP servers (for example, the NTP server A52 and the NTP server B53), the URL of plurality of the NTP servers (for example, the HTTP server A54 and the HTTP server B55) and the URL of the contents server 56 are stored in the ROM8.

The CPU 9 executes calculation or control in accordance with the control program stored in the ROM 8 or in the external storage device 15. The timer 10 is connected with the CPU and provides a standard clock signal and interrupting timing to the CPU 9.

A user can make various inputs and settings by using the panel switch 12 connected with the detector 11. The panel switch 12 may be any type of an input device that can output signal corresponding to user's input, such as a switch, a pad, a fader, a slider, an alphanumerical keyboard, a mouse, a rotary encoder, a joy-stick, a jog-shuttle and the like.

The performance switch 22 is connected with the detector 11 and provides musical performance information in accordance with musical performance by the user. A musical keyboard, the pad and the like can be used as the performance switch 22. Moreover, the performance switch 22 is not limited to those, but may be any type of an input device that can be input musical performance information based on musical performance by the user.

The displaying circuit 13 is connected with the display 14 and displays various types of information on the display 14. The display 14 can display various data (for example, HTML contents and the like) received from the contents server, other than displaying various parameters. Also, the display 14 can display the current (real) time based on the time information providing means (the server). The user executes various inputs and settings referring to the information displayed on the display 14. Also, the display 14 may be consisted by connecting an external display device.

The external storage device 15 includes an interface for the external storage device and is connected to the bus 6 via the interface. The external storage device 15 is, for example, a flexible disc or the floppy (trademark) disc drive (FDD), a hard disc drive (HDD), magneto optical disc (MO) device, the CD-ROM (compact disc read only memory) device, the DVD (Digital Versatile Disc) device, a semiconductor memory and the like.

When the hard disc drive (HDD) is connected as the external storage device 15, the control program or the program for realizing the embodiment of the present invention can be stored in the hard disc (HDD) in the external storage device 15. The CPU 9 can execute the same process as in the case the control program and the like being stored in the ROM 8 by reading out the control program from the hard disc to the RAM 7. By doing this, addition and version-up of the control program can be easily executed.

Moreover, when the CD-ROM is connected in addition to the hard disc drive, the control program or the program for realizing the embodiment can be stored also in the CD-ROM. The control program and the program for realizing the embodiment of the present invention can be installed from the CD-ROM to the hard disc. New installation and version-up of the control program can be easily performed.

The MIDI interface (MIDI I/F) can connect with a MIDI device 17, other musical instrument, an audio-visual device, a computer and the like, and can receive and transmit at least a MIDI signal. The MIDI interface 16 is not limited to an exclusive MIDI interface, but may be consisted by using a widely used interface such as the RS-232C, the USB (Universal Serial Bus), the IEEE1394 and the like. In this case, data other than MIDI message (signals) can be received and transmitted.

The MIDI device is an audio device or a musical instrument to be connected to the MIDI interface 16. The type of the MIDI device is not limited to a keyboard-type musical instrument, but may be a percussion instrument type, a wind instrument type, a stringed instrument type and the like. Moreover, a musical tone generator or an automatic musical performance device, etc. is not limited to one built in a main body of the electronic musical instrument but also can be a combination of independent devices connected via communication means such as MIDI or various networks.

The musical tone generator 18 generates musical tone signal in accordance with the musical contents stored in the external storage device 15, the ROM 8 or the RAM 7 or performance signal and MIDI signal provided from the performance switch 22 or from the MIDI device 17 connected with the MIDI interface 16, and provides the musical tone signal to the sound system 20 via the effecter (effect circuit) 19.

The effect circuit 19 adds various musical effects to the musical tone signal provided from the musical tone generator 18. The sound system 20 includes a D/A converter and a speaker, and converts the provided digital musical tone signal to the analogue type to pronounce.

The communication interface 21 can connect with a Local Area Network (LAN). Further, the communication interface 21 can connect with the communication network 3 such as the Internet via the provider 51, and can mutually connect with various types of the servers such as the NTP server A52, the NTP server B53, the HTTP server B55, the contents server 55 and the like.

Moreover, the communication interface 21 and the communication network 3 are not limited to be wired communication interface, but may be wireless communication interface. Moreover, the communication interface 21 may be a built-in type, or removable type such as one provided as a PC card.

Figure 2:
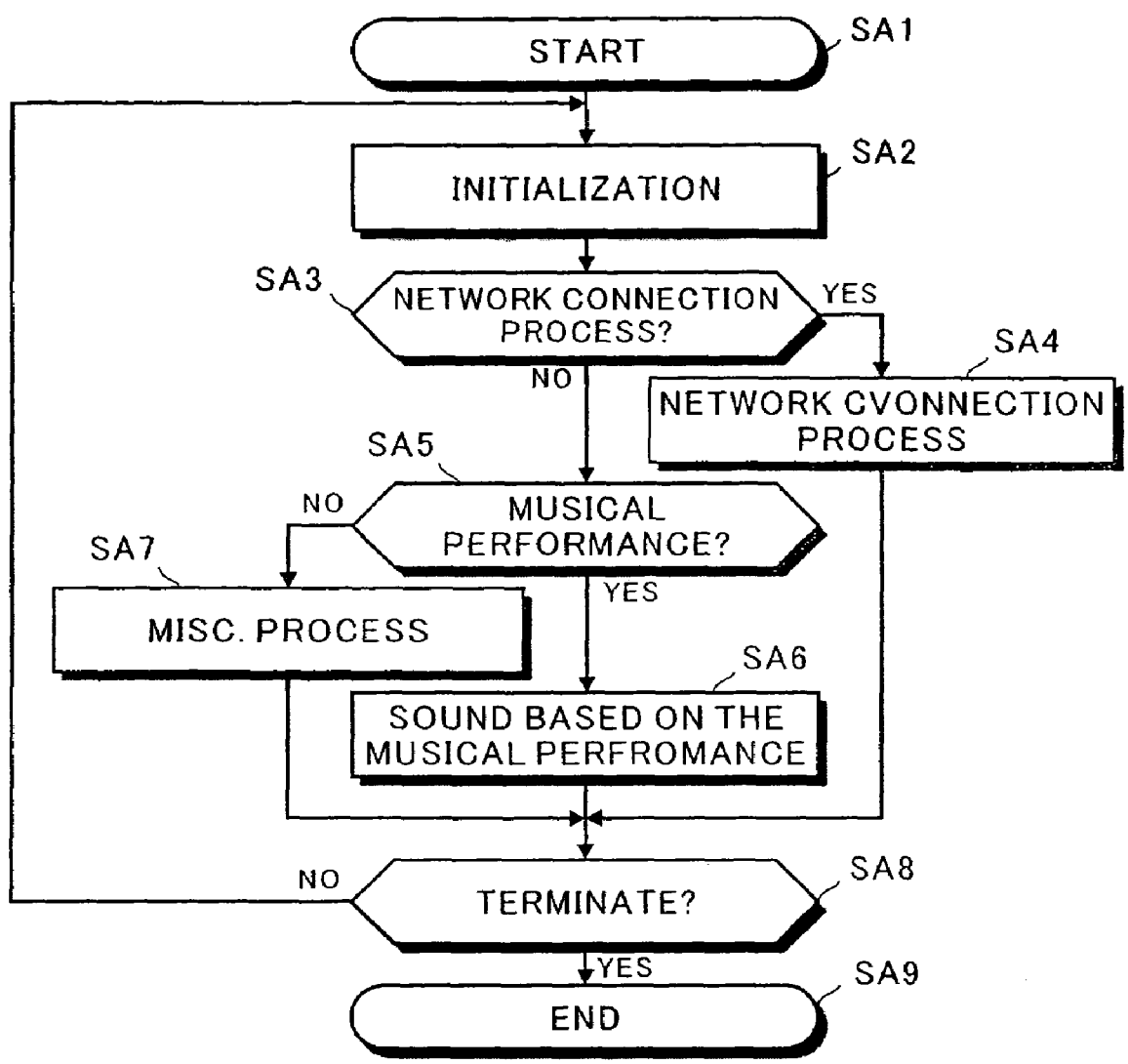
FIG. 2 is a flow chart showing a main process according to the embodiment of the present invention.

FIG. 2 is flow chart showing a main process according to the embodiment of the present invention. This main process is started upon turning the main power of the electronic musical apparatus 1 on.

At Step SA1, the main process is started, and at Step SA2, initialization is executed. Here, for example, various flags, buffers, registers and the like are initialized.

At Step SA3, it is judged whether a network connection process is instructed or not. In detail, in the embodiment of the present invention, it is defined to be the network connection instruction when the user inputs an instruction to execute a browser function equipped with the electronic musical apparatus 1. When the connection process is instructed, the process advances to Step SA4 as indicated with an arrow "YES" to execute the network connection process shown in FIG. 3. Thereafter the process advances to Step SA8. If the network connection process is not instructed, the process advances to Step SA5 as indicated with an arrow "NO".

At Step SA5, it is judged whether there is a performance operation or not, that is, whether a performance signal is input by the performance switch 22 in FIG. 1 or not. If there is a performance operation, the process advances to Step SA6 as indicated with an arrow "YES" to execute a pronunciation process based on the performance operation. If there is no performance operation, the process advances to Step SA7 as indicated with an arrow "NO".

At Step SA7, a miscellaneous process is executed. Here, miscellaneous process is a process other than the network connection process and the pronunciation process by the performance operation. For example, it is a process relating to reproduction, editing and file operation of automatic musical performance data stored in the external storage device 15 or the ROM 8 in FIG. 1 and various settings of the electronic musical apparatus 1.

At Step SA8, it is judged whether the main process is finished or not. Since this main process is continued from the turning on to the turning off of the electronic musical apparatus 1, it is defined to be the finishing instruction when the turning off operation is executed by the user. When finishing the process is instructed, the process advances to Step SA9 as indicated with an arrow "YES" to finish the main process. If finishing the process is not instructed, the process returns to Step SA3 as indicated with an arrow "NO" to repeat the process thereafter.

Figure 3:
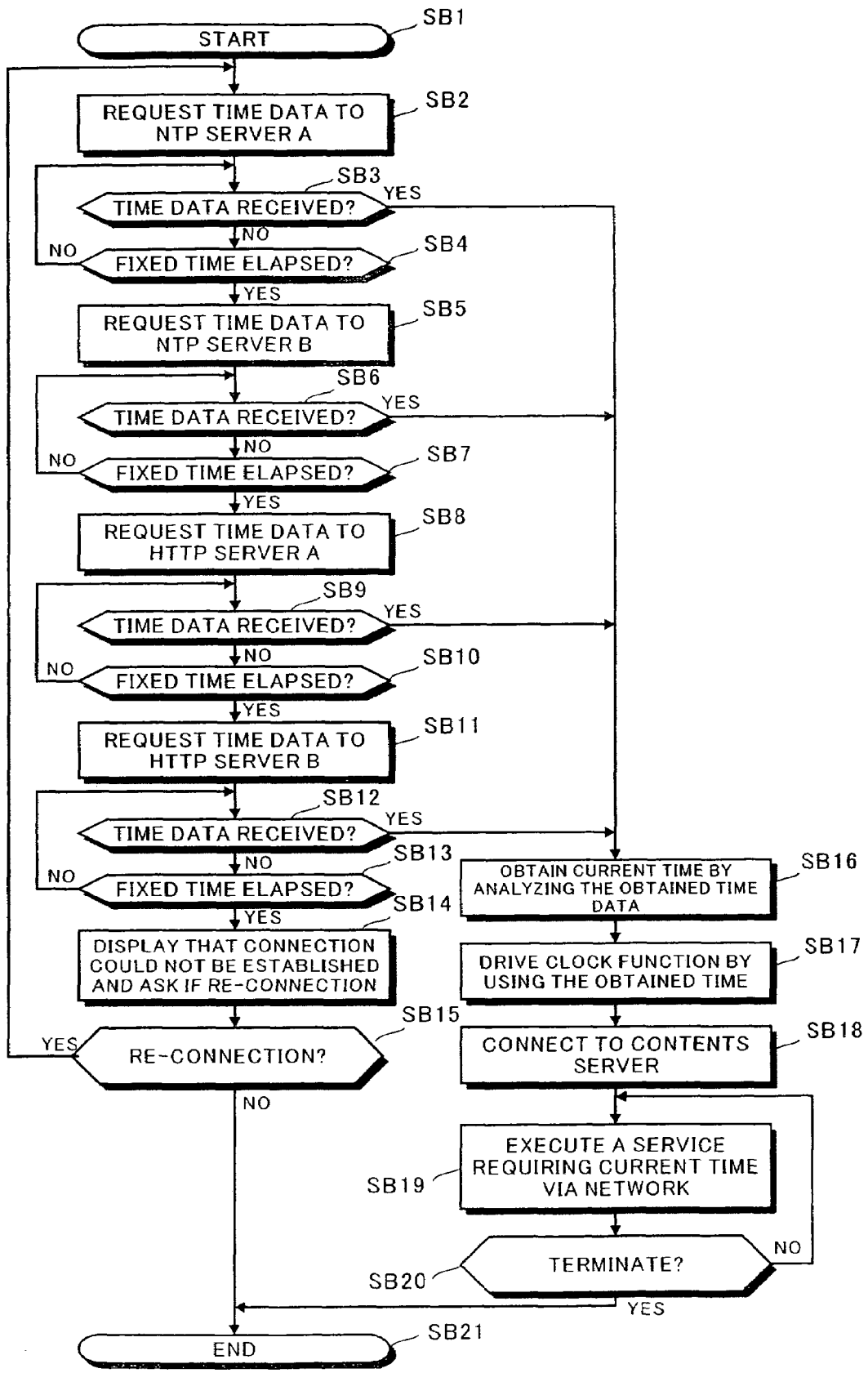
FIG. 3 is a flow chart showing a network connection process executed at Step SA4 in FIG. 2.

FIG. 3 is a flow chart showing the network connection process executed at Step SA4 in FIG. 2.

At Step SB1, the network connection process is started. For example, a connection with the communication network 3 such as the Internet is established by connecting with the provider 51 via the communication interface 21 in FIG. 1.

At Step SB2, time data is requested by connecting to an NTP server A that is a first time-providing server. At Step SB3, it is judged whether the time data (NTP message) requested at Step SB2 is received from the NTP server A or not. If the time data is received, the process advances to Step SB16 as indicated with an arrow "YES". If the time data is not received, the process advances to Step SB4 as indicated with an arrow "NO". At Step SB4, it is judged whether a fixed time (for example, 3 seconds) has elapsed from requesting the time data at Step SB2. If the fixed time has already elapsed, it is judged that there is no answer from the NTP server A, and the process advances to Step SB5 as indicated with an arrow "YES". If the fixed time has not elapsed yet, the process returns to Step SB3 as indicated with an arrow "NO".

At Step SB5, the time data is requested by connecting to an NTP server B that is a second time-providing server. At Step SB6, it is judged whether the time data (the NTP message) requested at Step SB5 is received from the NTP server B or not. If the time data is received, the process advances to Step SB16 as indicated with an arrow "YES". If the time data is not received, the process advances to Step SB7 as indicated with an arrow "NO". At Step SB7, it is judged whether a fixed time (for example, 3 seconds) has elapsed from requesting the time data at Step SB5. If the fixed time has already elapsed, it is judged that there is no answer from the NTP server B, and the process advances to Step SB8 as indicated with an arrow "YES". If the fixed time has not elapsed yet, the process returns to Step SB6 as indicated with an arrow "NO".

At Step SB8, the time data is requested ("GET" request is transmitted) by connecting to an HTTP server A that is a third time-providing server. At Step SB9, it is judged whether the time data (to which the time information is inserted in its HTTP header) requested at Step SB8 is received from the HTTP server A or not. If the time data is received, the process advances to Step SB16 as indicated with an arrow "YES". If the time data is not received, the process advances to Step SB10 as indicated with an arrow "NO". At Step SB10, it is judged whether a fixed time (for example, 3 seconds) has elapsed from the time data request at Step SB8 or not. If the fixed time has already elapsed, it is judged that there is no answer from the HTTP server A, and the process advances to Step SB11 as indicated with an arrow "YES". If the fixed time has not elapsed yet, the process returns to Step SB9 as indicated with an arrow "NO".

At Step SB11, the time data is requested ("GET" request is transmitted) by connecting to an HTTP server B that is a fourth time-providing server. At Step SB12, it is judged whether the time data (to which the time information is inserted in its HTTP header) requested at Step SB11 is received from the HTTP server B or not. If the time data is received, the process advances to Step SB16 as indicated with an arrow "YES". If the time data is not received, the process advances to Step SB13 as indicated with an arrow "NO". At Step SB13, it is judged whether a fixed time (for example, 3 seconds) has elapsed from the time data request at Step SB11 or not. If the fixed time has already elapsed, it is judged that there is no answer from the HTTP server B, and the process advances to Step SB14 as indicated with an arrow "YES". If the fixed time has not elapsed yet, the process returns to Step SB12 as indicated with an arrow "NO".

At Step SB14, it is displayed that the network connection cannot be established (cannot obtain the time data) on the display 14 in FIG. 1 to ask whether reconnection (obtaining the time data again) should be tried or not. At Step SB15, it is judged whether the user instructs the reconnection or not. If reconnection is instructed, the process returns to Step SB2 as indicated with an arrow "YES" to repeat the process after that. If the reconnection is not instructed, the process advances to Step SB21 as indicated with an arrow "NO" to terminate the network connection process.

At Step SB16, the time data (NTP message) received at Step SB3 or Step SB6, or the time data (the time information inserted in the HTTP header) received at Step SB9 or Step SB12 is analyzed to obtain current time (real time). At Step SB17, a clock function having executed the present time setting with the obtained time at Step SB16 is driven until the power of the electronic musical apparatus is turned off.

At Step SB18, the electronic musical apparatus is connected with a predetermined server such as a contents server providing musical contents. At Step SB19, the electronic musical apparatus receives and transmits data by the communication requiring the real time such as the SSL certificate, the Cookie and the like, and executes a service via the network by executing necessary processes such as screen display, reproduction of music and data storage. etc. based on the data received and transmitted.

At Step SB20, it is judged whether the network connection is instructed to be terminated or not. If the network connection is terminated, the process advances to Step SB21 as indicated with an arrow "YES". If the network connection is not terminated, the process returns to Step SB19 as indicated with an arrow "NO".

At Step SB21, the network connection is terminated. In order to terminate the network connection, the browser is terminated, or the browser is terminated by the termination instruction by the user being browsing only the information stored in the apparatus without terminating the browser (i.e., so-called off-line mode).

FIG. 4 is a flow chart showing the time information transmitting process by a HTTP server according to the embodiment of the present invention. This process is repeated during driving the HTTP server.

At Step SC1, time information transmitting process is started. At Step SC2, an initialization is executed.

At Step SC3, it is judged whether the time data request ("GET" request) is received from the electronic musical apparatus 1 that is a client or not. If the time data is requested, the process proceeds to Step SC4 indicated with an arrow "YES". If the time data is not requested, the process proceeds to Step SC5 indicated with an arrow "NO" to finish the process at this time.

At Step SC4, the time data request received at Step SC3 is replied, and the data inserted the time information (the GMT world standard time) in the HTTP header is transmitted to the electronic musical apparatus 1. The form of an enhanced part of the HTTP header to be transmitted is "X-Time: Day, Date Month Year Time (in 24 hours): minute: second GMT" as shown in FIG. 5. The name of the enhanced field is "X-Time", and the form of the part writing data and time is based on a writing method of RFC822: Date header. For example, a case of "17:23:51, Friday, Jul. 30, 2004" will be "X-Time: Fri, 30 Jul. 2004 17:23:51 GMT". Then the process advances to Step SC5 to terminate the time information transmitting process.

As described in the above, according to the embodiments of the present invention, for example, if the usage of the NTP protocol is prohibited by a part of the CATV connection and the firewall setting, exact time information can be obtained by obtaining the time information by using the HTTP. Therefore, the network service requiring the real time such as the SSL and the Cookie can be used.

Moreover, according to the embodiments of the present invention, since the time information is obtained from the NTP server or the HTTP server at every network connection, the electronic musical apparatus 1 does not need to keep the real time other than at a time of the network connection. Therefore, the electronic musical apparatus does not need to be equipped with a power source (for example, battery) for keeping the real time with the inner clock. Therefore, manufacturing cost can be lowered.

Further, when the electronic musical apparatus 1 is driven to execute the network connection, the time setting of the electronic musical apparatus 1 is executed by obtaining the time information on the network, and the clock function can be driven based on the obtained time information. Therefore, the service requiring time on the network can be used.

Moreover, according to the embodiments of the present invention, since the electronic musical apparatus 1 tries to connect with plurality of the servers for both of the NTP server and the HTTP server, the time information can certainly be obtained although when one server cannot be used for a certain reason.

Furthermore, in the embodiments of the present invention, the NTP server and the HTTP server are explained as the different servers; however, one server that can provide service in both protocols may be used. Also, the same server as the NTP server and the HTTP server may be used as the contents server.

In addition to that, in the embodiments of the present invention, the time data is requested to each of the NTP server and the HTTP server; however, the number of the servers to be tried to obtain the time data is not limited to those, for example, the time data may be requested to three servers for each of the NTP server and the HTTP server. Also, the contents server 56 may be plural numbers of servers.

Moreover, in the embodiment of the present invention, if the time information cannot be obtained, the network connection cannot be established; however, the network connection may be established by making limitation to use only the service that does not need the real time. Also, in that case, the user may manually input the time information.

The present invention has been described in connection with the preferred embodiments. The invention is not limited only to the above embodiments. It is apparent that various modifications, improvements, combinations, and the like can be made by those skilled in the art.

What are claimed are:

1. An electronic musical apparatus having no power source for keeping real time, comprising:

an instructing device that instructs establishment of connection to a network via a communication interface;

a first time information obtaining device that obtains time information from a first time information provider connected to the network;

a second time information obtaining device that obtains time information from a second time information provider connected to the network when the first time information obtaining device cannot obtain the time information;

an analyzer that analyzes the first or second time information to obtain a current time;

a clock that is driven, after setting the obtained time, until the electronic musical apparatus is turned off; and an executing device that executes a service provided by a content server distributing music related contents via the network by using the time of the clock.

2. The electronic musical apparatus according to claim 1, wherein the connection to the network is terminated when the time information cannot be obtained from both of the first and the second time information providers.

3. The electronic musical apparatus according to claim 1, wherein the first and the second time information providers are either one of a hyper text transfer protocol server or a network time protocol server.

4. The electronic musical apparatus according to claim 1, wherein the service executed by the executing device is a service using an SSL certificate or Cookie.

5. A method for an electronic musical apparatus having no power source for keeping real time to execute a service via a network, comprising the steps of:

instructing establishment of connection to a network via a communication interface;

obtaining time information from a first time information provider connected to the network;

obtaining device time information from a second time information provider connected to the network when the time information cannot be obtained from the first time information provider;

analyzing the first or second time information to obtain a current time;

driving a clock, after setting the obtained time, until the electronic musical apparatus is turned off; and executing a service provided by a content server distributing music related contents via the network by using the time of the clock.

6. A storage medium storing a program, which a computer executes to realize a process for an electronic musical apparatus having no power source for keeping real time to execute a service via a network, comprising the instructions for:

instructing establishment of connection to a network via a communication interface;

obtaining time information from a first time information provider connected to the network;

obtaining device time information from a second time information provider connected to the network when the time information cannot be obtained from the first time information provider;

analyzing the first or second time information to obtain a current time;

driving a clock, after setting the obtained time, until the electronic musical apparatus is turned off; and executing a service provided by a content server distributing music related contents via the network by using the time of the clock.

* * * * *